United States Patent
Suzuki et al.

(10) Patent No.: US 7,284,912 B2
(45) Date of Patent: Oct. 23, 2007

(54) MULTI FIBER OPTICAL INTERCONNECT SYSTEM, WITH PUSH—PUSH TYPE INSERTION/WITHDRAWAL MECHANISM, MT-TYPE CONNECTOR AND SHUTTERED ADAPTER AND METHOD FOR USING SAME

(75) Inventors: Toshio Suzuki, Saitama (JP); Gregory Bunin, Deerfield, IL (US)

(73) Assignees: Illum Technologies, Inc., Northbrook, IL (US); Adamant Kogyo Co., Ltd. (JP)

( * ) Notice: Subject to any disclaimer, the term of this patent is extended or adjusted under 35 U.S.C. 154(b) by 0 days.

(21) Appl. No.: 11/166,556

(22) Filed: Jun. 24, 2005

(65) Prior Publication Data
US 2006/0153504 A1    Jul. 13, 2006

Related U.S. Application Data

(63) Continuation-in-part of application No. 11/155,360, filed on Jun. 17, 2005, which is a continuation-in-part of application No. 11/036,306, filed on Jan. 12, 2005.

(51) Int. Cl.
G02B 6/38 (2006.01)
(52) U.S. Cl. ............................. 385/75; 385/60; 385/62; 385/72
(58) Field of Classification Search ................ 385/60, 385/62, 72, 75
See application file for complete search history.

(56) References Cited

U.S. PATENT DOCUMENTS

| | | | |
|---|---|---|---|
| 4,726,647 A | 2/1988 | Kakii et al. | |
| 5,214,730 A | 5/1993 | Nagasawa et al. | |
| 5,317,663 A | 5/1994 | Beard et al. | |
| 5,734,778 A | 3/1998 | Loughlin et al. | |
| 5,838,856 A | 11/1998 | Lee | |
| 6,238,278 B1 | 5/2001 | Haftmann | |
| 6,634,796 B2 | 10/2003 | de Jong et al. | |

(Continued)

OTHER PUBLICATIONS

Research at Photonics Laboratories (4-5); MU-type Angled-PC Connector, Copyright 2004 Nippon Telegraph and Telephone Corporation, 1 page.

(Continued)

Primary Examiner—Michelle Connelly-Cushwa
Assistant Examiner—Jerry T. Rahill
(74) Attorney, Agent, or Firm—Patzik, Frank & Samotny Ltd.

(57) ABSTRACT

An optical fiber interconnect system comprising a connector for carrying an array of optical fibers along a longitudinal axis. The adapter comprises a push-push coupling mechanism configured to receive and couple with the connector upon application of a first pushing force to the connector. The connector is disengaged and may be withdrawn from the adapter upon application of a second pushing force upon the connector. The pushing forces can be applied at a pushing region by using a stylus member.

Spring-biased automatic shutters are included in the adapter to provide protection against dust and other contaminants, as well as eye injuries, when only one of the connectors is inserted in the adapter. The release mechanism that disengages the connector and adapter facilitates the handling of a small connector. When the release is operated, the separation of the connector and adapter is initiated actively without the need of a strong pull.

22 Claims, 8 Drawing Sheets

U.S. PATENT DOCUMENTS

| | | |
|---|---|---|
| 6,695,489 B2 | 2/2004 | Nault |
| 6,823,109 B2 | 11/2004 | Sasaki et al. |
| 6,886,990 B2 | 5/2005 | Taira et al. |
| 6,918,704 B2 | 7/2005 | Marrs et al. |
| 6,934,450 B2 | 8/2005 | Hiramatsu |
| 2005/0286833 A1* | 12/2005 | Kramer et al. ............ 385/55 |
| 2006/0067627 A1 | 3/2006 | Crews et al. |

OTHER PUBLICATIONS

HMU Series; MU Type Fiber Optics Connectors, 20 pages.

* cited by examiner

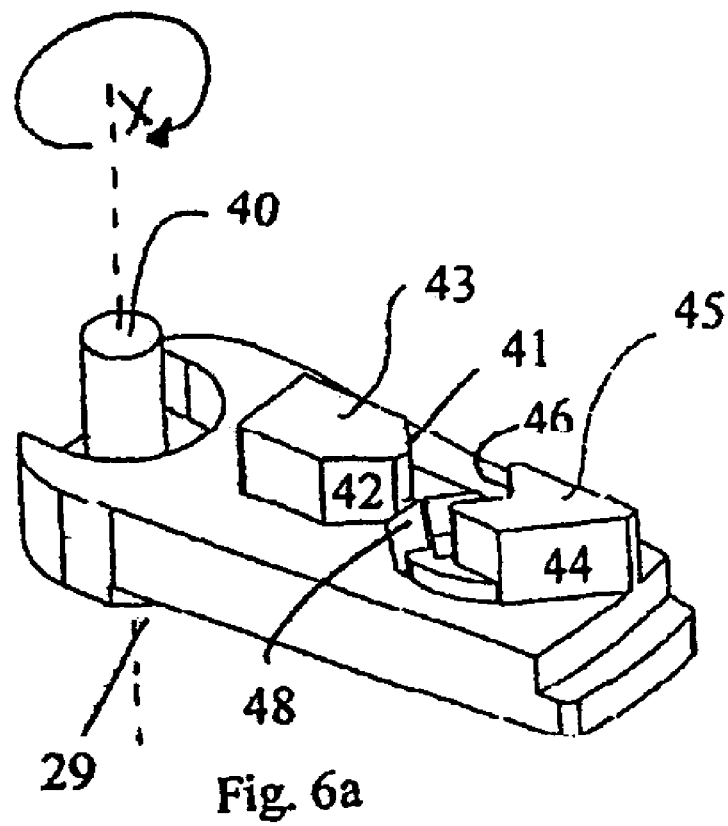
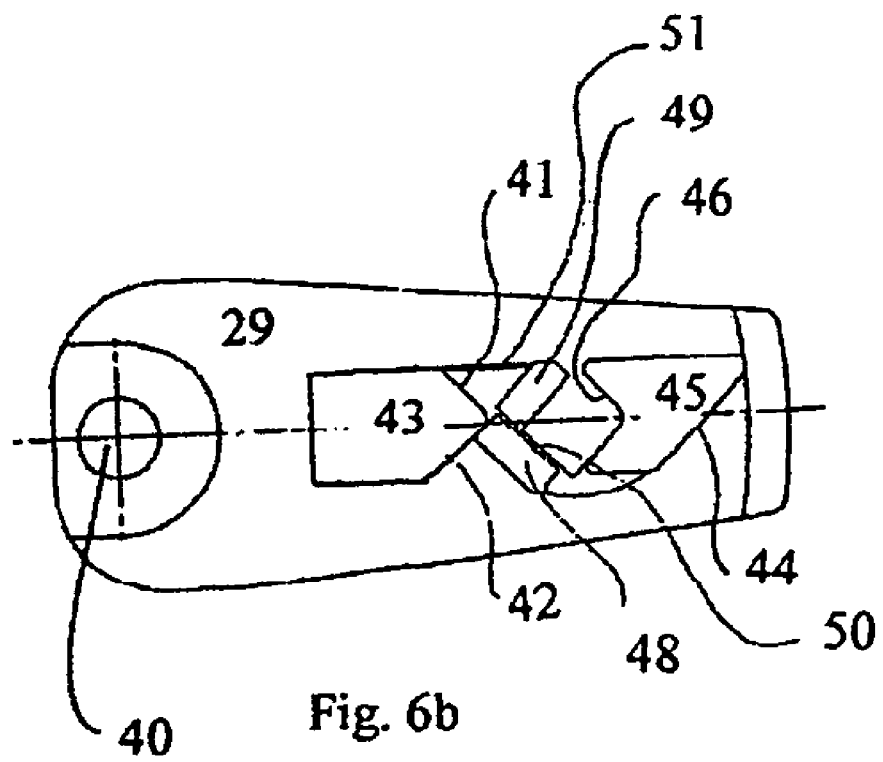
Fig. 6a
Fig. 6b

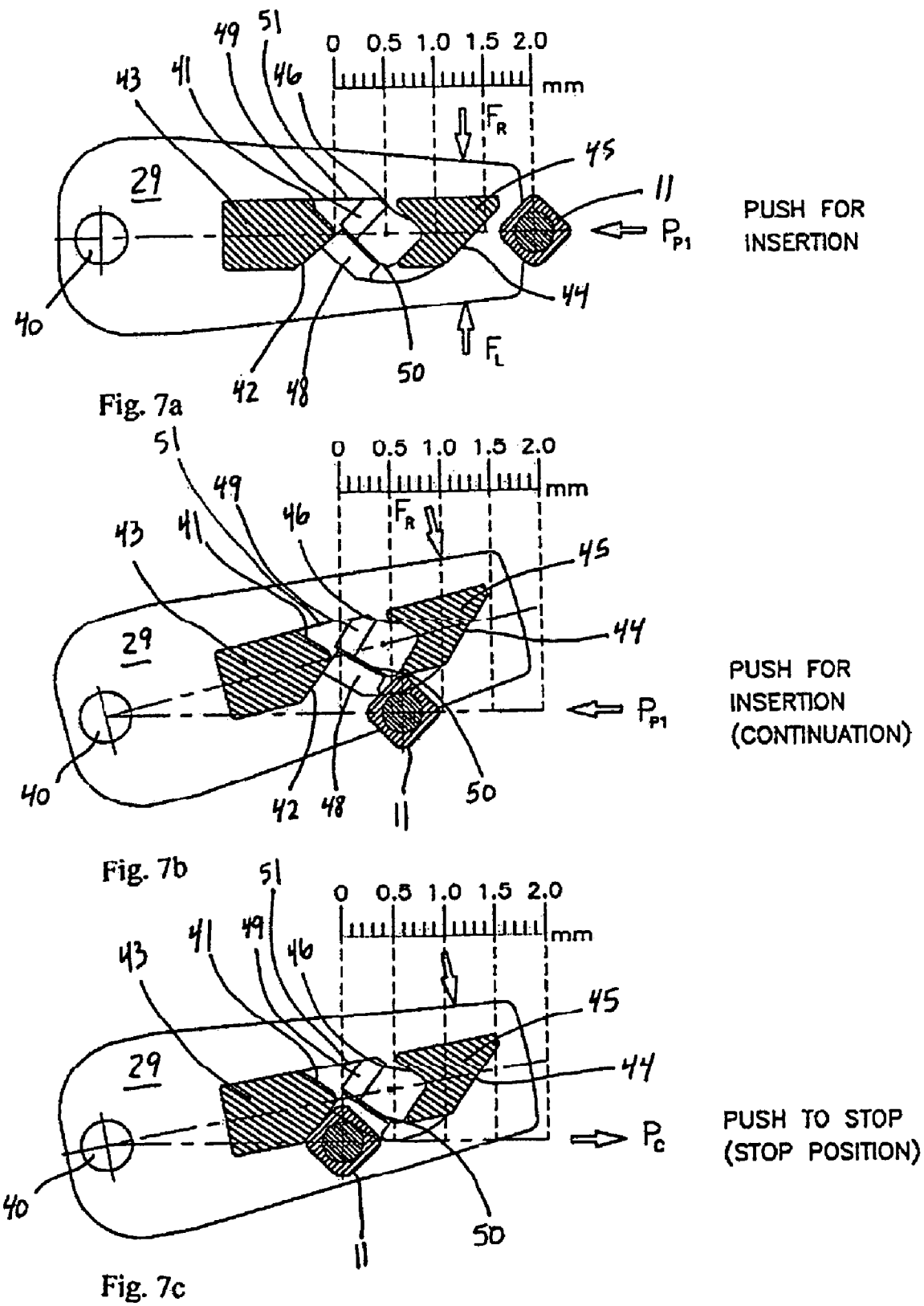

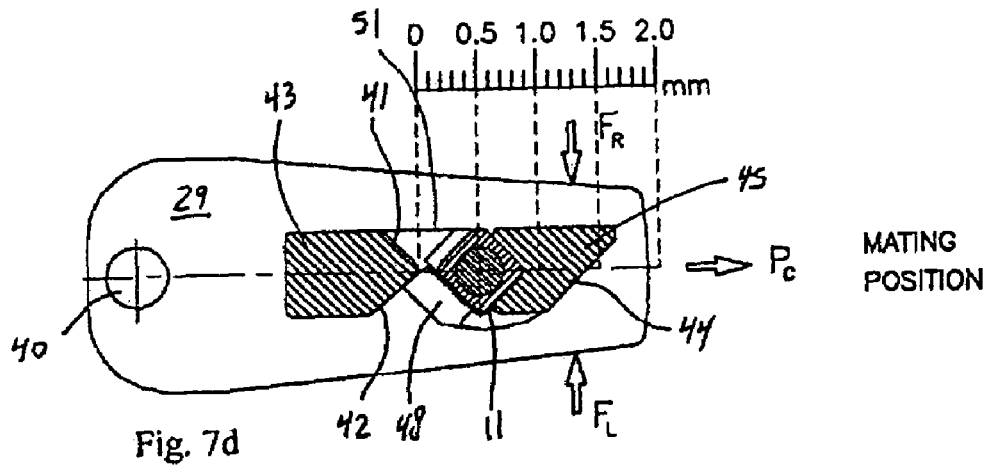
Fig. 7d — MATING POSITION
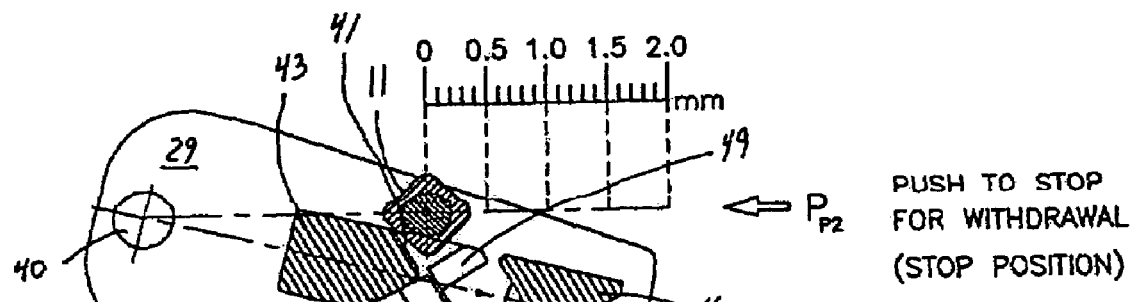
Fig. 7e — PUSH TO STOP FOR WITHDRAWAL (STOP POSITION)
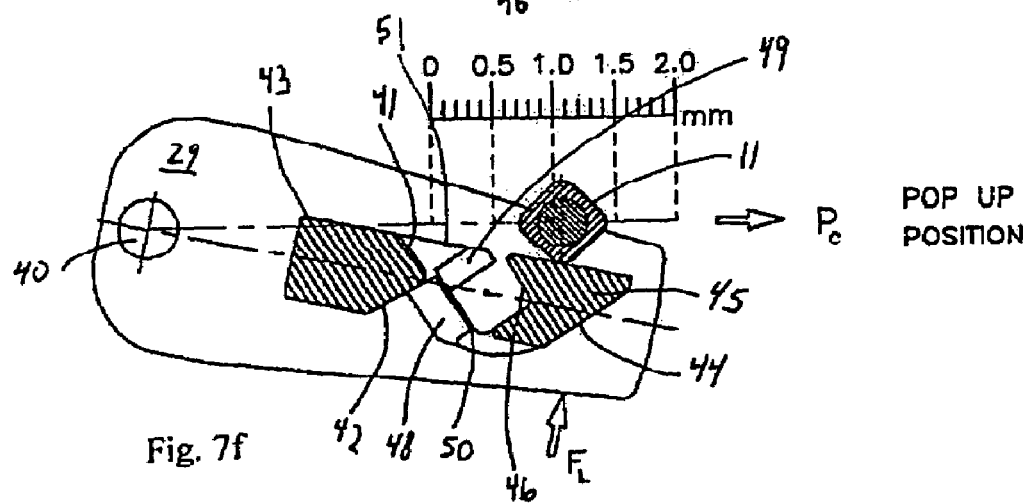
Fig. 7f — POP UP POSITION

MULTI FIBER OPTICAL INTERCONNECT SYSTEM, WITH PUSH—PUSH TYPE INSERTION/WITHDRAWAL MECHANISM, MT-TYPE CONNECTOR AND SHUTTERED ADAPTER AND METHOD FOR USING SAME

This is a continuation-in-part application of a application on Ser. No. 11/155360 entitled Ultra-Small, Form Factor Single Fiber Optical Interconnect System, With Push-Push Type Insertion/Withdrawal Mechanism And Shuttered Modular Connector And Shuttered Adapter And Method For Using Same, filed Jun. 17, 2005, which is a continuation-in-part of Ser. No. 11/036,306 entitled Ultra-Small, Form Factor Single Fiber Optical Interconnect System With Shuttered Connector and Shuttered Adapter filed on Jan. 12, 2005.

FIELD OF INVENTION

The invention relates to fiber optics or fiber optical interconnect systems and, more particularly, to a multi-fiber optic interconnect system consisting of fiber connectors and corresponding adapters for the precise end-to-end mating of fiber optic cables. More particularly, the invention further relates to an MT-type interconnect system consisting of fiber optic connectors and corresponding adapters with a "push-push" insertion/withdrawal mechanism and a method for using the same.

BACKGROUND OF INVENTION

In the fiber optics field, the need frequently arises to connect or disconnect connectors and adapters in both single channel and multiple channel connectors and adapters. The invention here disclosed applies primarily to multiple fiber applications. There is a continuously increasing demand for higher density interconnect systems in fiber optics applications, especially in those cases where multiple fiber connectors or multiple fiber ferrules are not conveniently reachable due to small size, routing or other considerations.

In the fiber optics field, the need frequently arises to transfer light from one fiber to another either permanently or temporarily. Optical connector plugs or connectors are one of the solutions used for this purpose. Fibers terminated with optical connector plugs can be coupled together and disconnected when necessary, either to end the connection or to route the light to a different fiber. Optical connector plugs can be of the single or multiple fiber variety. Single fiber connector plugs (simplex connector plugs) provide the connection of only one fiber to another single fiber. In multiple fiber connector plugs, several fibers are simultaneously coupled with another set of similar fibers. The invention here disclosed applies primarily to multi-fiber applications.

Traditionally, in multi-fiber connectors, the connection is achieved by the use of MT-type ferrules. The ferrules, which may be manufactured mostly from plastic, have a number of channels of a diameter slightly larger than the optical fiber. It is appreciated that the ferrules may be manufactured from materials other than plastic including, but not limited to ceramics, metal and glass and not depart from the scope of the present invention. In use, the optical fibers are inserted into the channels and maintained fixed therein by the use of adhesives such as, but not limited to, epoxy, or mechanical clamping. The ends of the fibers are preferably made to be flat or protrude slightly from the end surfaces of the ferrule and are then terminated, generally by a polishing procedure or other means that provides a very smooth surface of optical quality.

Two connectors may be mated using an adapter. Each connector preferably comprises the ferrule and a ferrule holder. One of the two mated connectors usually has a ferrule with a pair of alignment pins, while the other connector has a ferrule with a pair of alignment holes. Modern fiber optic connectors usually have a spring mechanism that pushes the ferrules towards one another with a controlled force in order to achieve physical contact of both of the ferrules' ends, thereby improving the optical performance of the connection.

The termination or polishing of the fiber ends is a very involved and delicate procedure which results in the fiber position being either slightly below or above the ferrule end-face surface. The protrusion of the fibers from the ferrule end has to be controlled to very tight tolerances in order to avoid damage of the fiber ends when in physical contact. The pressure between fibers has to be kept in a narrow range in order to keep the glass in its elastic region and thereby prevent fiber rupture as well as preventing the movement of the fibers inside the ferrule channels (pistoning) when the two connectors are mated. It is also very important to obtain a very smooth surface free of scratches and other defects, especially in the central core section of the fiber where the light travels. In particular, since ferrule ends and fibers are preferably polished together, it is necessary to prevent released ferrule material from damaging the fiber ends during this procedure.

Keeping fiber optic connector plugs free from contaminants such as dirt or dust is also very important. Dirt or dust on fiber ends can scatter or absorb light, causing excessive loss of signal and corresponding poor system performance. Presence of contaminants inside the connector plug could cause misalignment with similar consequences. Likewise, because of the intensity of the light being transferred, it is important to shelter users from unintended viewing thereof, so as to prevent eye injury.

There is also a continuously increasing demand for higher density interconnect systems in fiber optics applications. The introduction by the present invention of a multi-fiber connector with the standard MT type ferrule has resulted in a small multi-fiber connector/adapter system with a push-push mechanism that allows for very high density configurations.

SUMMARY OF INVENTION

One object of the present invention is to provide a small footprint, multi-fiber optical interconnect system suitable for high density applications which has a push-push mechanism for quick and convenient connect/disconnect operation in an environment where it is difficult to reach and activate a conventional fiber optical interconnect system. One embodiment of the system disclosed herein comprises two miniature connectors and an adapter. The miniature connectors can handle multi-channel MT standard ferrules so as to enable the acceptance of bare and cabled fiber optics. The push-push mechanism is controlled by the connectors' internal springs as well as by two identical springs in the adapter, and works automatically when connectors are connected or disconnected to or from the interior of the adapter. In this version of the invention, pushing a first time on the connector connects the connector to the adapter, while pushing on the connector a second time serves to disconnect the connector from the adapter.

The connectors can handle standard MT ferrules in an embodiment to accept bare and cabled fiber optics. In this version of the invention, dust and laser protection shutters are located at both sides of the adapter. The shutters are preferably controlled by a spring mechanism, and open and close automatically when connectors and adapters are attached or separated. Latches are also included that keep the connection securely together, and a release mechanism that actively uncouples the connector and adapter is included in the body of the connector. The adapter also is preferably made of a material or coated so as to provide for protection from EMI (electromagnetic interference).

The adapter is designed to provide sufficient freedom to enable alignment of the ferrules during the mating or connecting process. Ideally, the goal is to provide for a floating connection of the ferrules within the adapter housing. This also is true for connectors using angle-polished ferrules which can have ends polished to a variety of angles including a preferred embodiment of about 8 degrees relative to the optical axis. The angled ends of the ferrules are the mating surfaces of the two connectors in face-to-face fashion.

In a preferred embodiment of the shuttered adapter version of the invention, an adapter shutter mechanism comprises a serpentine-shaped spring acting upon cams of shutter doors that are mounted to rotate about a vertical axis at each end of the adapter. Other types of springs and means for biasing the shutter doors into a normally closed position, such as, but not limited to, spring clips, coil springs, torsion springs and elastic materials, should be considered as being within the scope of this invention. When the adapter does not have a connector inserted in an open end, the serpentine-spring pushes against the cam of the shutter door at the open end so as to urge it into the closed position. When the connector is pushed into the open end of the adapter, the front of the connector pushes against the adapter shutter door and overcomes the force of the serpentine-spring on the adapter shutter door so as to automatically move the shutter door into the open position.

Spring loading of the ferrule inside of the connector is preferably provided by two coil springs serving to bias the ferrule forward within the connector housing; however, other types of springs and means for biasing the ferrule forward, such as, but not limited to, spring clips, torsion springs and elastic materials, should be considered as being within the scope of this invention.

Numerous other features and advantages of the present invention will become apparent from the following detailed description of the invention, the accompanying drawings and the appended claims, wherein like reference numerals refer to like parts.

BRIEF DESCRIPTION OF DRAWINGS

The design of the system can be better understood by following the description of the drawings set forth herein. A brief description of each figure is included here.

FIG. 6a is a perspective view of the bottom of the flipper of the present invention.

FIG. 6b is a bottom plan view of the flipper of FIG. 6a.

FIGS. 7a-7f are schematic views which show different positions of the flipper of the adapter and dual pin of the connector during the push-push insertion and withdrawal actions.

DETAILED DESCRIPTION OF DRAWINGS

Figure 1:
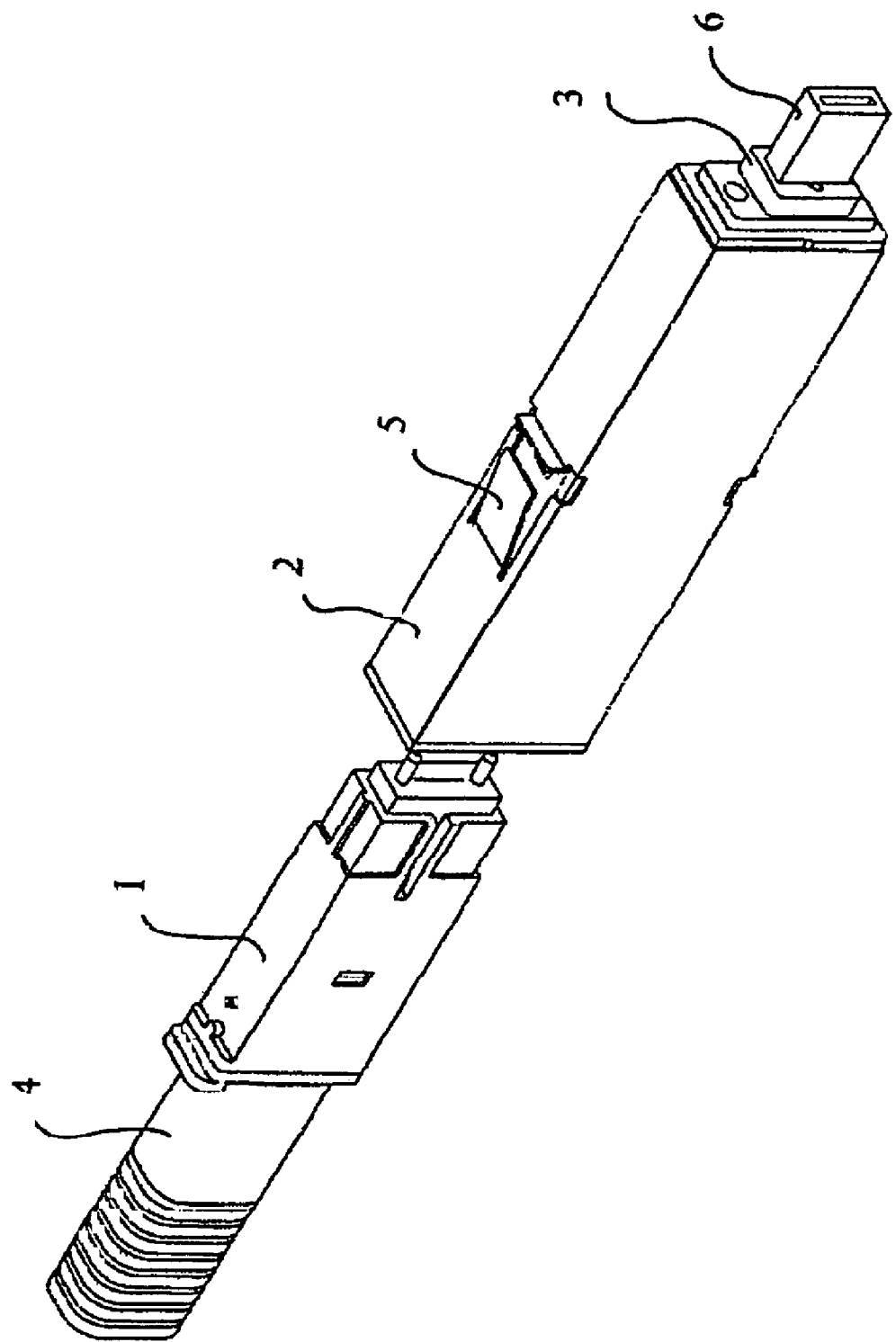
FIG. 1 shows an overall perspective view of the miniature connector/adapter system of the present invention.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring to FIGS. 1 through 7, there is shown one embodiment of a miniature MT type connector/adapter system with a push-push insertion/withdrawal mechanism. The miniature MT type connector/adapter system includes a male connector 1, an adapter 2, and a female connector 3.

In FIG. 1, male connector 1 is shown as a structure designed for fiber optic ribbon cable with straight strain relief boot 4 in the position before being inserted into adapter 2, and female connector 3 is shown as having a small strain relief boot 6 designed for bare ribbon when it is fully inserted into adapter 2 and fixed in the mated condition. Any other combinations of connector types with different gender, different boots, ferrule mode types (single and multi mode), number of channels, etc. are possible and should be considered within the scope of present invention.

Figure 2:
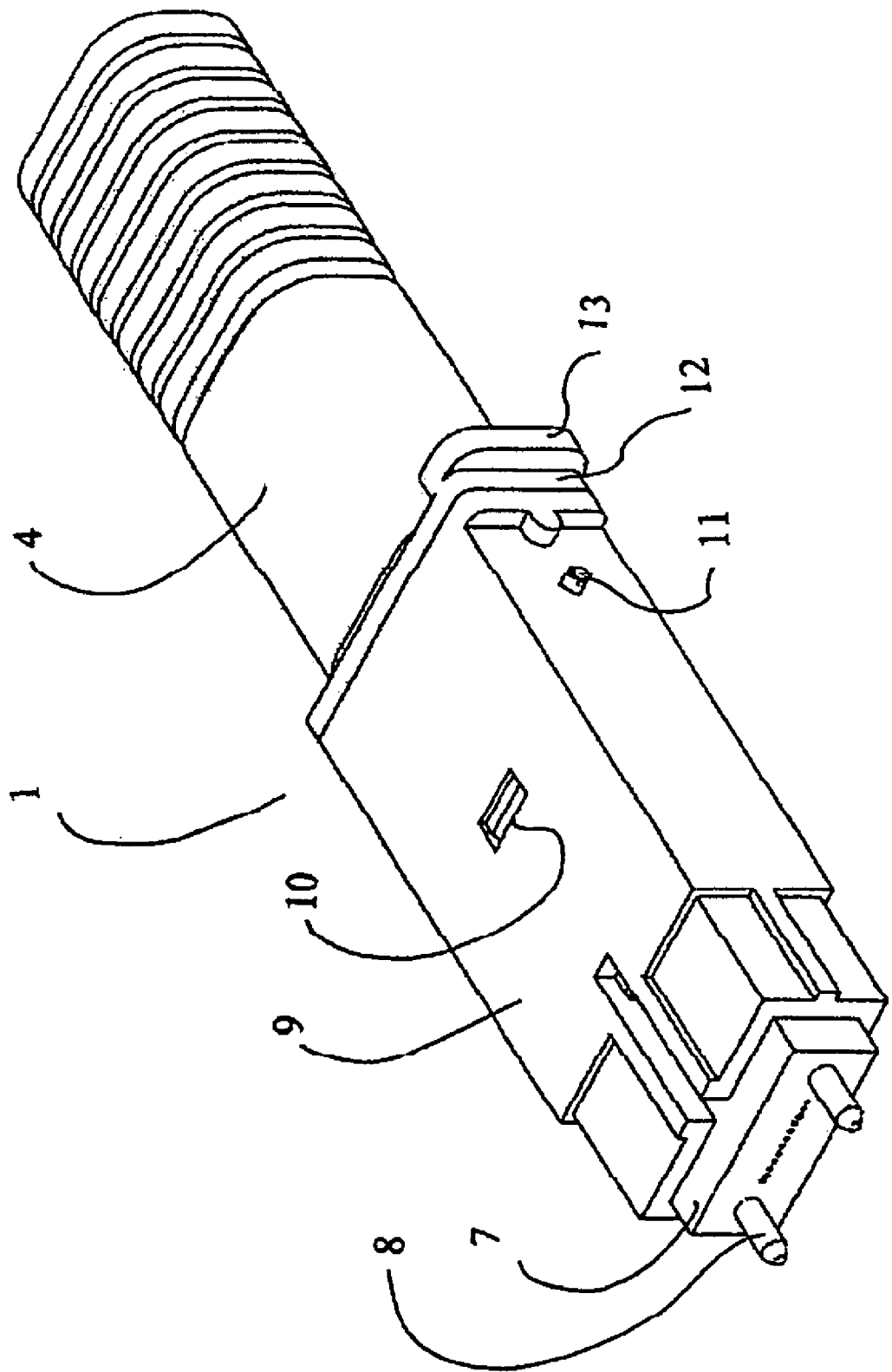
FIG. 2 is a perspective view of the miniature connector shown in FIG. 1.

FIG. 2 is an isometric view of the male connector 1 of FIG. 1 showing a miniature MT-type ferrule 7 with two pins 8 which makes it a male connector. It also shows front housing 9 with two latch openings 10 (only one opening is visible) and a dual pin 11. In addition, it shows rear housing 12 with pushing tab 13 and straight strain relief boot 4. Different configurations of the boot (for example 90°, 60°, 45°, etc.) should be considered in the scope of the present invention.

Figure 3:
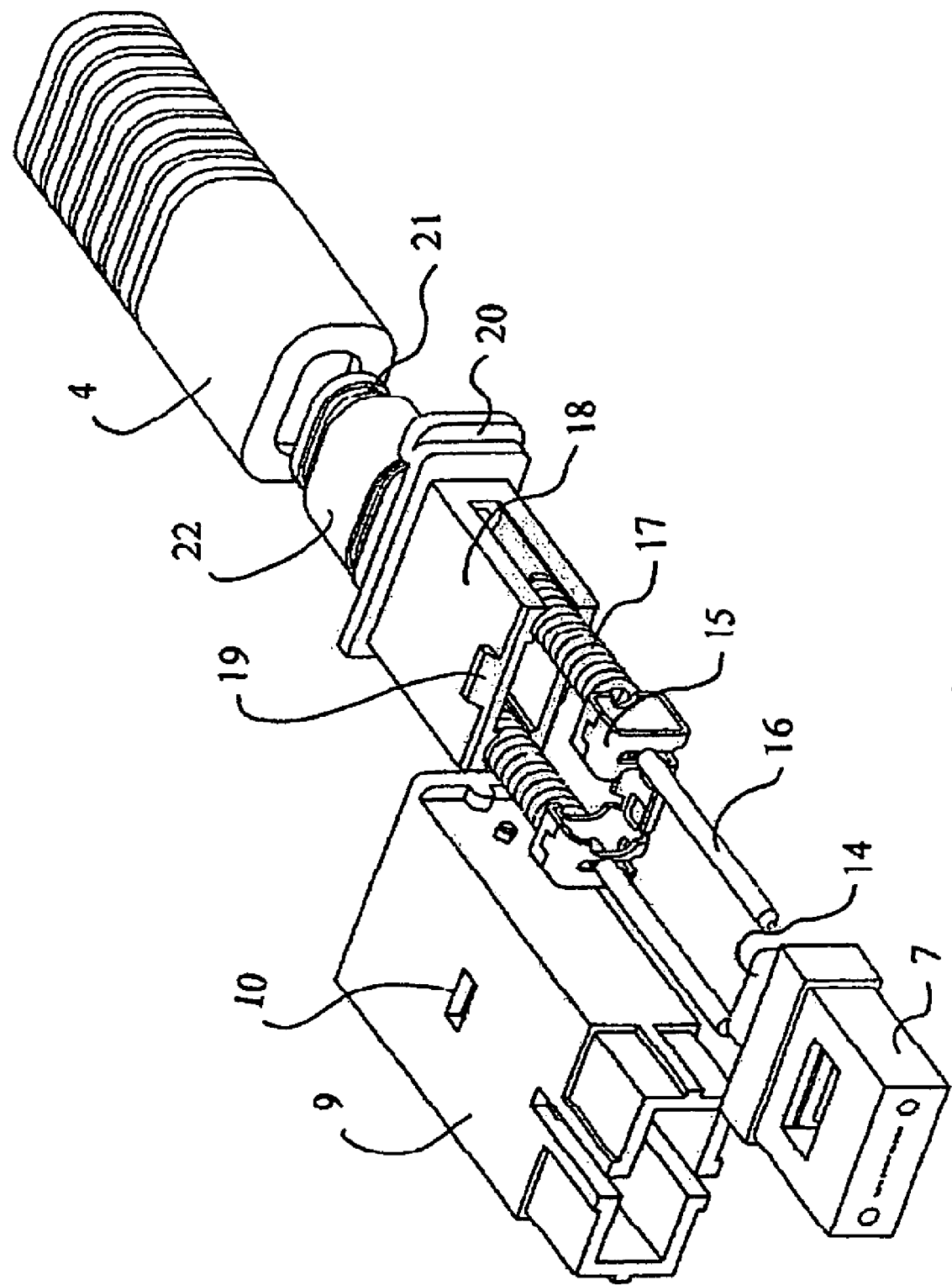
FIG. 3 is a partially exploded view of the miniature connector shown in FIG. 2.

FIG. 3 is a partially exploded view of the connector 1 of FIG. 2. It shows MT ferrule 7 with internal boot 14 which is inserted into the ferrule 7 from the rear. It also shows preassembled pin holder 15 and two alignment pins 16. It should be understood that pin holder 15 is preassembled with pins 16 only in the male configuration of the connector 1. If connector 1 should be assembled as a female configuration then alignment pins 16 are not installed.

Pin holder 15 (with or without alignment pins 16) pushes or biases ferrule 7 straight ahead by two connector springs 17. Rear housing 18 has two nests for springs 17 so they can push pin holder 15 and, consequently, ferrule 7 up to the stop (not shown) inside of the connector housing 9. Rear housing 18 is preferably secured inside of the connector housing 9 by two latches 19 that snap into two openings 10 in the connector housing 9 (only one latch and one opening are shown). Once connected, ferrule 7 is spring loaded with a standard force designed for optimal contact between fibers. Rear housing 18 also has a tab 20 which is used for pushing the male connector 1 by pen or stylus for insertion or withdrawal when density does not allow human fingers to do that job.

In addition, rear housing 18 preferably has a grooved tail 21 which serves, together with the oval crimp tubing 22, as a holding means for a fiber optic cable's aramid yarn. It should be understood that the bare ribbon version of the connector has a rear housing 18 without the grooved tail and no crimp tubing is present.

The male connector 1 also preferably has a strain relief boot 4 (can be of many different configurations) for use with cables or a small boot 6 (as shown in FIG. 1 for the female connector 3) for use with bare ribbons.

Figure 4:
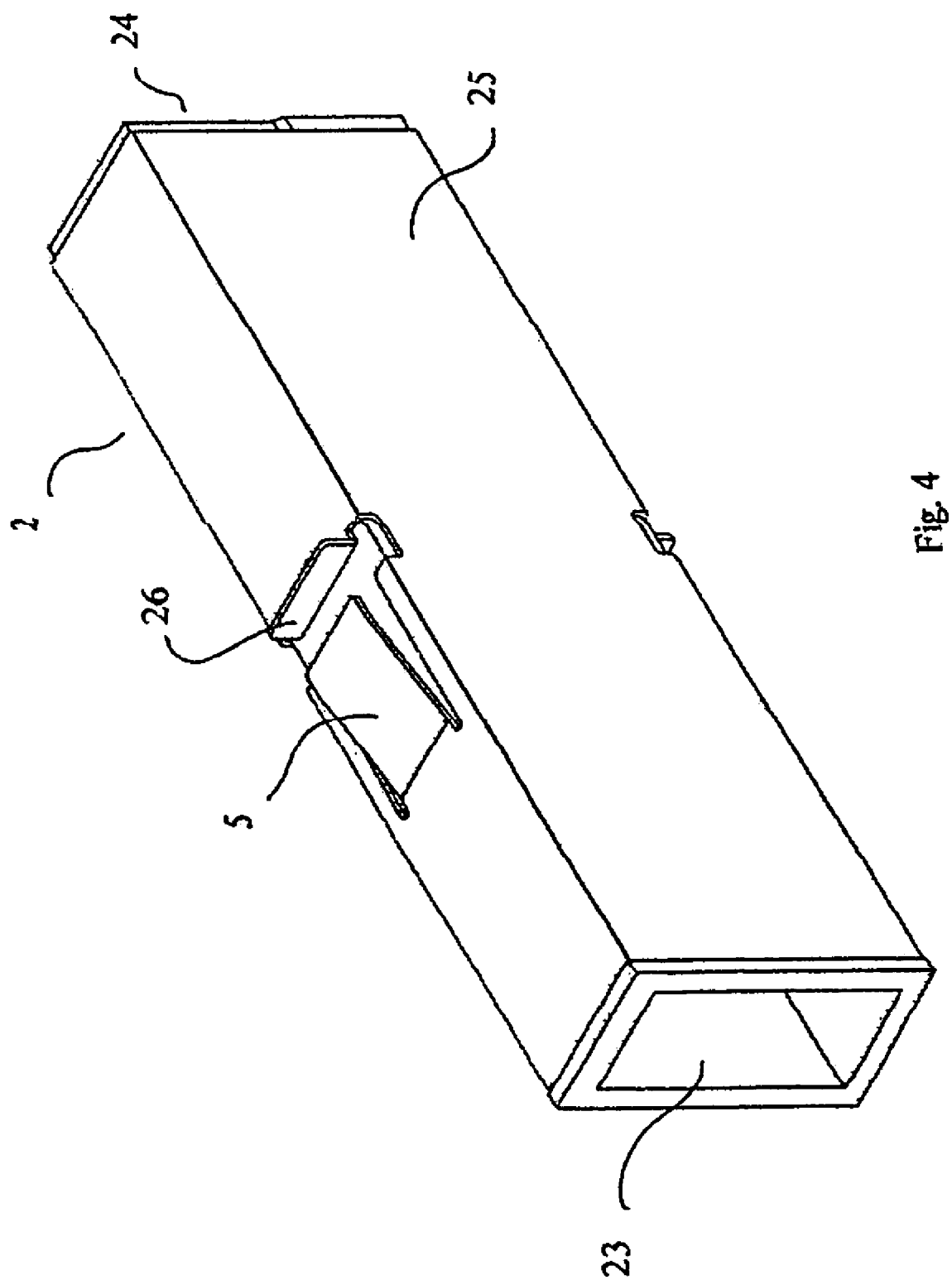
FIG. 4 is a perspective view of the adapter for the miniature connector of FIG. 3 showing the openings at each end for receiving a connector in each opening.

Referring now to FIG. 4, the adapter 2 is shown with two apertures 23 and 24 at its ends, where two connectors 1 and/or 3 (See FIG. 1) are intended to be inserted. FIG. 4 also shows outer shell 25 which serves as a holder (i.e., it holds the various parts of the adapter together) and a cover of all the internal parts as well as an EMI shield. Adapter 2 also preferably has two latches 5 (only upper latch is visible) and two stoppers 26 (only upper stopper is visible) that are designed to assist in mounting the adapter on a panel (not shown) having a particular thickness. While the adapter is shown as being flangeless, it is appreciated that it may be flanged and not depart from the scope of the present invention.

Figure 5:
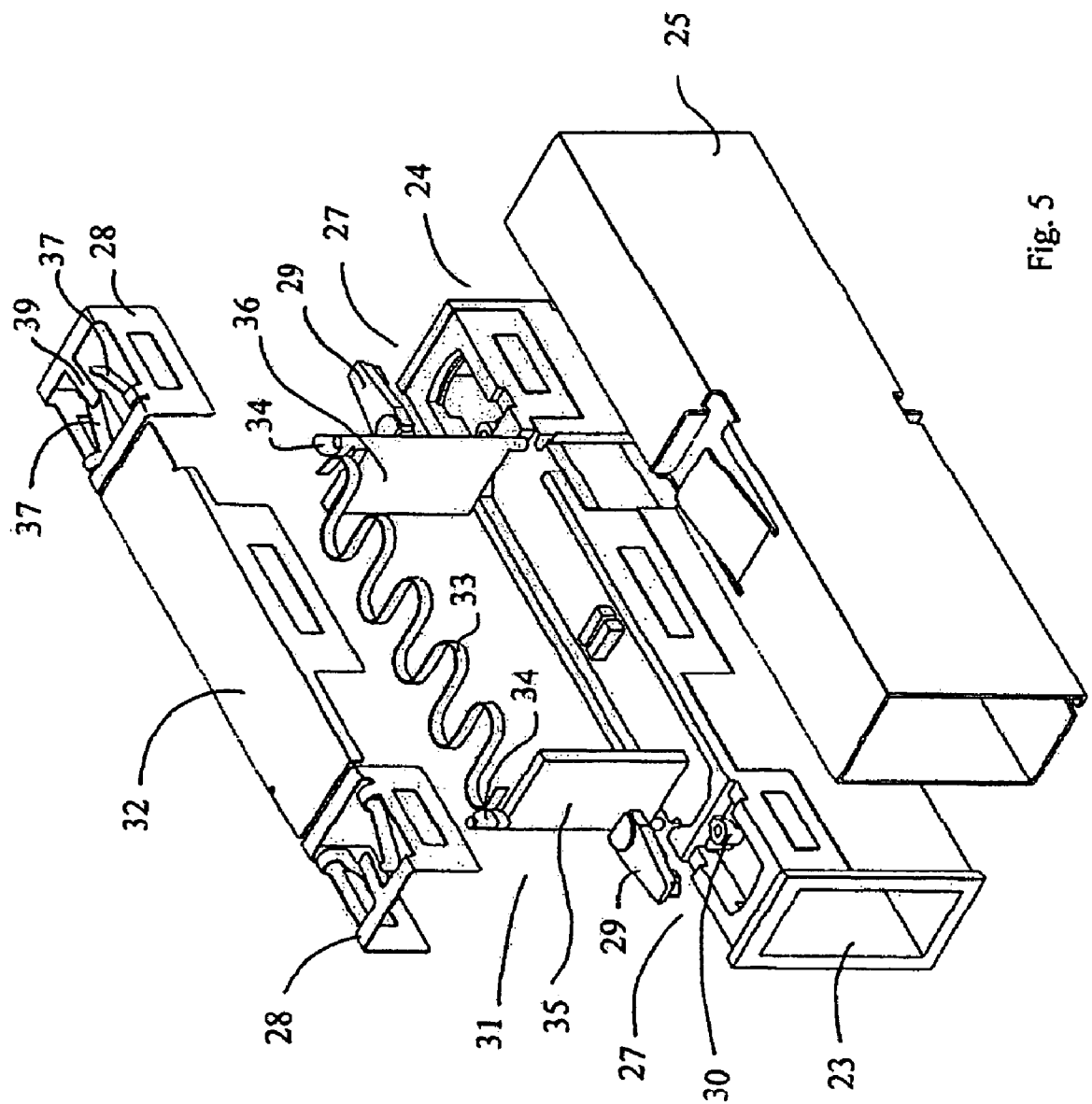
FIG. 5 is an exploded perspective view of the adapter of FIG. 4 illustrating the shutters with their respective cams, the serpentine-spring normally contained therein and the outer shell removed.

FIG. 5 shows an exploded view of the push-push adapter 2 (see FIG. 4). In this view, two push-push mechanisms 27 are shown near each of the apertures 23 and 24. Each mechanism 27 consists of triple prong spring clip 28, flipper 29, and nest 30, which serves as a vertical axis about which the flipper 29 rotates or pivots. Also shown in FIG. 5 are dual shutter mechanism 31 and its cover 32. FIG. 5 also shows the serpentine-shaped spring 33 which outwardly biases two cams 34, each of which is respectively attached to ends of vertically mounted internal shutters 35 and 36. Shutters in this example each have a vertical axis of rotation. When connectors 1 are not inserted into the receiving apertures 23 and 24 of the adapter 2, spring-biased cams 34 are pushed by spring 33 and rotate so that the internal shutters 35 and 36 are in the closed position to provide protection against dust and other contaminants, as well as to prevent eye injuries due to the intensity of the light being transferred. It is appreciated that the connector may be a male connector or a female connector and not depart from the scope of the present invention.

Adapter also preferably contains a barrel containing an alignment sleeve (not shown) that can, to some extent, freely float inside of the barrel to assist in optimally aligning two ferrules being engaged in physical, end-to-end contact from two opposite sides of the adapter 2.

It should be understood that dual pin 11 (shown on FIG. 2) is an integral part of the push-push mechanism 27, since this dual pin 11 serves as an actuator of the mechanism 27. Each triple prong spring clip 28 has two side arms 37 that keep flipper 29 in the middle position in line with the longitudinal axis of the adapter when the push-push mechanism 27 is not actuated. Triple prong spring clip 28 also has a horizontally positioned arm 39 that presses flipper 29 down in order to maintain its constant contact with dual pin 11 (see FIG. 2) while performing push-push action during insertion and withdrawal of the connector 1 into or out off the adapter 2. The insertion of connectors 1 into this engaged and retained relationship with adapter 2 can be accomplished by, among other things, applying a longitudinal force to tab 13 (see FIG. 2) by using a stylus, pen point, paper clip end or the like.

FIGS. 6a and 6b show the flipper 29 in detail. FIG. 6a is an isometric view of the bottom surface of the flipper 29, while FIG. 6b is a bottom plan view of the flipper 29. FIGS. 6a and 6b show that flipper 29 includes pin 40 providing a vertical axis X about which flipper 29 swings or pivots to the left and to the right during the push-push operation. Also shown are inclined cam surfaces 41 and 42 of projection 43 and inclined cam surface 44 of projection 45 which urge flipper 29 to swing to the left or to the right based on direct contact with dual pin 11 of the connector 1, depending upon whether dual pin 11 (see FIG. 2) moves forward or backward respectively, during either the insertion or withdrawal operation.

As further shown in FIG. 7d, V-grooved surface 46 of projection 45 reliably keeps connector 1 in its mating position by holding squared portion of dual pin 11 with the force of two internal connector springs (not shown). Cams 48 and 49 facilitate the flipper's 29 movement over the ramped edges 50 and 51 while the non-ramped opposite vertical sides of those edges 50 and 51 prevent flipper 29 from sliding back and swinging in the wrong direction during insertion or withdrawal of connector 1 into or from adapter 2. As pushing force $P_{P1}$ continues to move left in FIG. 7b until it reaches face 42 of projection 43 which as shown in FIG. 7c, acts as a stop, while flipper 29 rotates upwardly about axis X, which extends longitudinally through the center of pin 40, as shown in FIG. 6a.

FIGS. 7a through 7f schematically show the interaction between flipper 29 and dual pin 11 during insertion and withdrawal of connector 1 into or from adapter 2. In those diagrams, arrows $F_R$ and $F_L$ represent right and left biasing forces created by two side legs 37 of the spring clip 28 (see FIG. 5). Those forces tend to keep flipper 29 in the neutral position when inactive. Arrows $P_{P1}$ represent the insertion force when connector 1 moves into the adapter 2 during the first "push" action. Arrows $P_C$ represent the force provided by two main connector springs (not shown in FIG. 7) which tends to either: (1) keep connector 1 in the mating position with the adapter 2 or, (2) push connector 1 out of the interior of adapter 2 after the second "push" action.

As shown in FIG. 7e, Arrow $P_{P2}$ represents a force of a second "push" action. Each of FIGS. 7a through 7f also has a virtual 2 mm ruler which shows the relative position of flipper's 29 different elements described earlier and both square and circular elements of dual pin 11 during each step of the insertion and withdrawal processes.

In reference to FIGS. 7a through 7c, in operation, connection is initiated by pushing connector 1 in the direction of arrow $P_{P1}$ of FIG. 7a, until it is received in opening 24 of adapter 2 (FIG. 4). As square portion of pin 11 of connector 1 contacts and then slides along in contact with surface 44, it is guided along ramped cam surface 48 until it reaches the stopped position (FIG. 7c) by resting against angled surface 42. Further movement of connector 1 into the interior of adapter 2 is thus prohibited. Because flipper 29 is free to rotate about axis X, corresponding to pin 40 and hole 30 (FIG. 5), the spring force $F_R$ provided by the side legs 37 of spring clip 28 is overcome and flipper 29 rotates counterclockwise as viewed in FIG. 7b, until pin 11 reaches the stop position against surface 42 as shown in FIG. 7c. When connector 1 is released and no longer pushed inwardly into the interior of adapter 2, biasing forces $F_r$ and $F_1$ of spring clip 28 tend to move flipper back to the center position of FIG. 7d, while ramped cam surface 48 tends to urge pin 11 downwardly into the mated position so as to abut surfaces 50 and 46 as shown in FIG. 7d by capturing square portion of pin 11 therein.

To unmate and withdraw connector 1 from adapter 2, connector 1 is again pushed inwardly along the longitudinal axis as viewed in FIGS. 7e and 7f and towards the interior of adapter 2. Pin 11 is then unseated from the mated position as follows. As inward force $P_{P2}$ is applied, pin 11 moves up ramped surface 49 and along surface 41 (so that it is no longer captured between surfaces 50 and 46) and it slides along surface 51. Once pin 11 is freed, connector 1 can then be withdrawn from adapter 2. Because flipper 29 can rotate about axis X, the biasing force $F_L$ is overcome and flipper 29 rotates clockwise as viewed in FIGS. 7e and 7f.

Many modifications and variations of the present invention are possible in light of the above teachings. It is therefore to be understood that within the scope of the appended claims, the invention may be practiced otherwise than as specifically described. Various modifications, changes and variations may be made in the arrangement, operation and details of construction of the invention disclosed herein without departing from the spirit and scope of the invention. The present disclosure is intended to exemplify and not limit the invention.

We claim:

1. A method of connecting and disconnecting a multi-fiber optical connector and adapter having a longitudinal axis comprising the steps of:
   applying only a first pushing force to said connector towards said adapter in a direction along the longitudinal axis until said adapter receives said connector;
   engaging said connector with said adapter in an operable arrangement; and,
   applying only a second pushing force to said connector towards said adapter in the same direction as the first pushing force so as to disengage said connector from said adapter and withdraw said connector from said adapter.

2. The method according to claim 1 wherein said method further includes using a stylus member to apply said pushing forces to said connector for connecting and disconnecting said connector to and from said adapter.

3. A multi-fiber optical interconnect system comprising:
   a connector for carrying a plurality of optical fibers along a longitudinal axis; and
   an adapter configured to operably connect with said connector; wherein said adapter comprises a coupling mechanism receiving and coupling with said connector upon application of only a first pushing force to said connector in a direction along the longitudinal axis so as to removably receive the connector in operably connected fashion; and
   wherein said coupling mechanism uncouples said connector from said adapter upon the application of only a second pushing force thereto in the same direction as the first pushing force for withdrawal of said connector from said adapter.

4. The multi-fiber optical interconnect system according to claim 3 wherein a stylus member is used to apply said pushing forces to said pushing region.

5. The multi-fiber optical interconnect system according to claim 3 wherein said connector comprises a strain relief boot.

6. The multi-fiber optical interconnect system according to claim 5 wherein the strain relief boot is straight.

7. The multi-fiber optical interconnect system according to claim 5 wherein the strain relief boot is angled.

8. The multi-fiber optical interconnect system according to claim 3 wherein said adapter further comprises a shutter for selectively preventing access to said coupling mechanism to protect against contaminants and eye injuries.

9. The multi-fiber optical interconnect system of claim 8 wherein said shutter is spring biased into a closed position when said connector is not connected to said adapter.

10. The multi-fiber optical interconnect system according to claim 1 wherein said connector further includes a pushing region on its exterior for applying said pushing forces.

11. A multi-fiber optical interconnect system comprising:
    a connector for carrying a plurality of optical fibers along a longitudinal axis;
    an adapter configured to operably connect with said connector and comprising an interior;
    said connector comprising a pin member affixed thereto, protruding therefrom for entering the interior of said adapter;
    said adapter comprising a coupling mechanism receiving and coupling with said connector upon application of only a first pushing force to said connector in a first direction along the longitudinal axis so as to removably receive the connector in operably connected fashion; and
    said coupling mechanism further comprising a spring-biased pivoting member for retaining said pin member when said adapter and connector are engaged as said first pushing force is applied to said connector;
    wherein said pin member is urged into a free position so as to disengage said connector from said adapter upon application of only a second pushing force upon said connector in the same direction as the first pushing force and for withdrawal of said connector from said adapter.

12. A multi-fiber optical interconnect system of claim 11 wherein said adapter further comprises a shutter for selectively preventing access to said interior of said adapter to protect against contaminants and eye injuries.

13. The multi-fiber optical interconnect system of claim 12 wherein said shutter is spring biased into a closed position when said connector is not inserted into the interior of said adapter.

14. The multi-fiber optical interconnect system of claim 11 wherein said pin member comprises a portion thereof having a substantially square transverse cross-section for removable engagement with said pivoting member.

15. A multi-fiber optic interconnect system comprising:
    a body having an interior and a longitudinal axis therethrough and at least two opening at its ends that lead to said interior;
    at least two connectors, wherein each connector comprises a ferrule received through said end openings of said body and within said body interior and coupled to said body by applying only a first pushing force along a first direction along the longitudinal axis;
    wherein at least one of the connectors is upcoupled from said body by applying only a second pushing force along the same direction as the first pushing force; and,
    said body further receiving said ferrule of a first connector of said at least two connector in operable, aligned end-to-end contact with the ferrule of a second connector of said at least two connectors within said body.

16. The multi-fiber optic interconnect system of claim 15 wherein said adapter further comprises a pair of shutter for selectively covering said at least two openings.

17. The multi-fiber optic interconnect system of claim 16 wherein said shutters are spring biased into closed positions when said at least two connectors are not inserted into said interior of said body.

18. The multi-fiber optic interconnect system according to claim 15 wherein said said ferrules are spring loaded within said at least two connectors.

19. The multi-fiber optic interconnect system according to claim 18 wherein said spring loading of said ferrule in each of said at least two connectors is provided by two coil springs serving to bias said ferrule forward within said connector.

20. The multi-fiber optic interconnect system according to claim 15 wherein said connector comprises a strain relief boot.

21. The multi-fiber optic interconnect system according to claim 15 wherein the strain relief boot is straight.

22. The multi-fiber optic interconnect system according to claim 15 wherein the strain relief boot is angled.

\* \* \* \* \*

UNITED STATES PATENT AND TRADEMARK OFFICE
CERTIFICATE OF CORRECTION

PATENT NO. : 7,284,912 B2  
APPLICATION NO. : 11/166556  
DATED : October 23, 2007  
INVENTOR(S) : Toshio Suzuki et al.

Page 1 of 1

It is certified that error appears in the above-identified patent and that said Letters Patent is hereby corrected as shown below:

Column 7

Line 47 replace "thereto" with --to the connector--

Line 50 replace "4" with --5--

Line 51 replace "3" with --4--

Line 53 replace "5" with --6--

Line 56 replace "6" with --7--

Line 57 replace "5" with --6--

Line 58 replace "7" with --8--

Line 59 replace "5" with --6--

Line 60 replace "8" with --9--

Line 64 replace "9" with --10-- and "8" with --9--

Column 8

Line 1 replace "10" with --4--

Line 2 replace "1" with "3"

Signed and Sealed this

Fourteenth Day of April, 2009

JOHN DOLL  
*Acting Director of the United States Patent and Trademark Office*